United States Patent
Yoshikai et al.

(10) Patent No.: US 10,399,533 B2
(45) Date of Patent: Sep. 3, 2019

(54) VEHICULAR SEAT

(71) Applicant: TACHI-S CO., LTD., Tokyo (JP)

(72) Inventors: Yukari Yoshikai, Tokyo (JP); Seiichiro Miyazaki, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 9 days.

(21) Appl. No.: 15/546,249

(22) PCT Filed: Nov. 16, 2015

(86) PCT No.: PCT/JP2015/082111
§ 371 (c)(1),
(2) Date: Jul. 25, 2017

(87) PCT Pub. No.: WO2016/121195
PCT Pub. Date: Aug. 4, 2016

(65) Prior Publication Data
US 2018/0022304 A1 Jan. 25, 2018

(30) Foreign Application Priority Data
Jan. 26, 2015 (JP) .................................. 2015-012253

(51) Int. Cl.
B60R 21/207 (2006.01)
B60R 21/201 (2011.01)
(Continued)

(52) U.S. Cl.
CPC ............ *B60R 21/2165* (2013.01); *B60N 2/58* (2013.01); *B60N 2/5883* (2013.01);
(Continued)

(58) Field of Classification Search
CPC ................ B60R 21/201; B60R 21/207; B60R 2021/2076; B60N 2002/5808
See application file for complete search history.

(56) References Cited

U.S. PATENT DOCUMENTS 5,927,749 A * 7/1999 Homier ................ B60N 2/5883
280/728.3
6,095,602 A 8/2000 Umezawa et al.
(Continued)

FOREIGN PATENT DOCUMENTS

| JP | 10-310017 A | 11/1997 |
| JP | 11-129854 A | 5/1999 |
| JP | 2003-127815 A | 5/2003 |

OTHER PUBLICATIONS

International Search Report for PCT/JP2015/082111 dated Feb. 2, 2016; English translation submitted herewith (3 pages).

*Primary Examiner* — Barry Gooden, Jr.
(74) *Attorney, Agent, or Firm* — Fitch, Even, Tabin & Flannery, LLP

(57) ABSTRACT

A vehicular seat capable of reducing a tensile force, which acts on a sewing thread in a webbing sewn part, enables desired expanding operation of a side air bag in the case of emergency. The vehicular seat has an air bag body, provided in the side part of the seat back, which tear-opens the extending part of the trim cover by expansion, to expand from the seat back. A wrap-sewn part, with its terminal end wrap-folded, is provided at an end sewn to the trim cover. The wrap-sewn part has an overlap part where the webbing is overlapped, and a non-overlap part provided at an end of the overlap part in a direction along a sewing line of sewing to the trim cover. The wrap-sewn part is sewn over the overlap and the non-overlap part with respect to the trim cover.

4 Claims, 6 Drawing Sheets

(51) Int. Cl.
*B60R 21/2165* (2011.01)
*B60N 2/58* (2006.01)

(52) U.S. Cl.
CPC .... *B60R 21/207* (2013.01); *B60N 2002/5808* (2013.01); *B60R 2021/2076* (2013.01)

(56) References Cited

U.S. PATENT DOCUMENTS

| | | | | |
|---|---|---|---|---|
| 2005/0156412 A1* | 7/2005 | Panagos | ................ | B60R 21/201 |
| | | | | 280/730.2 |
| 2008/0258440 A1* | 10/2008 | Muller | ................ | B60R 21/207 |
| | | | | 280/728.3 |
| 2013/0187416 A1* | 7/2013 | Nakata | ................ | B60R 21/207 |
| | | | | 297/216.13 |
| 2015/0336528 A1* | 11/2015 | Tanabe | ................ | B60R 21/207 |
| | | | | 280/728.2 |
| 2018/0022304 A1* | 1/2018 | Yoshikai | ................ | B60N 2/58 |
| | | | | 280/728.3 |

\* cited by examiner

VEHICULAR SEAT

CROSS-REFERENCE TO RELATED APPLICATIONS

This application is a U.S. national phase application filed under 35 U.S.C. § 371 of International Application No. PCT/JP2015/082111, filed Nov. 16, 2015, designating the United States, which claims priority from Japanese Patent Application No. 2015-012253, filed Jan. 26, 2015, which are hereby incorporated herein by reference in their entirety.

TECHNICAL FIELD

The present invention relates to a vehicular seat having a side air bag accommodated in a side part of a seat back.

BACKGROUND ART

As background technique in the present technical field, Japanese Patent Application Laid-Open No. Hei 10-310017 (Patent Literature 1) is known. In this gazette, a vehicular seat in which an expanding direction of a side air bag from a seat back is specified is described (see the abstract). In this vehicular seat, the side air bag is fixed, via an air bag bracket, to a side bracket of a seat back frame. Further, the side air bag is surrounded with webbing (backing cloth) provided to form a gap with respect to the side bracket, in an approximately horizontal direction. The both ends of the backing cloth are individually sewn (joined) to the front end of a gore part and the side end of a main part of a trim cover. Further, sewn ends of the backing cloth are sewn (joined) to each other as a sewn part capable of being torn by expansion of the side air bag.

CITATION LIST

Patent Literature

PTL 1: Japanese Patent Application Laid-Open No. Hei 10-310017

SUMMARY OF INVENTION

Technical Problem

According to the vehicular seat in the Patent literature 1, in the case of emergency, it is necessary that the sewn part which can be torn-opened by expansion of the side air bag (hereinbelow, referred to as a "torn-open part" or "extending part") is infallibly torn-opened (extended), and the joined state of the sewn part is kept between the end of the webbing (hereinbelow, referred to as "backing cloth") and the trim cover.

Before the extending part is torn-opened, or when the joined state of the sewn part of the webbing is released during a tear-open operation, there is a possibility that the expanding direction of the side air bag is changed. To infallibly tear-open the torn-open part and specify the expanding direction of the side air bag, generally, the sewn strength of the torn-open part is lower than the sewn strength of the sewn part between the webbing and the trim cover (hereinbelow, referred to as a "webbing sewn part"). The sewn strength is changed by changing the strength of a sewing thread used in the sewing.

However, in the webbing sewn part, the force to tear the webbing from the trim cover increases and becomes larger than the strength of the sewing thread in the webbing sewn part, in accordance with material of webbing or sewing manner in the sewn part. When the webbing is double-folded at the end of the webbing, and the double-folded part is sewn to the trim cover, a large tensile force is applied to the sewing thread in the webbing sewn part in some cases.

The object of the present invention is to provide a vehicular seat capable of reducing the tensile force which acts on the sewing thread in the webbing sewn part, and enables desired expanding operation of the side air bag in the case of emergency.

Solution to Problem

To attain the above object, in a vehicular seat according to the present invention, upon execution of a sewing process to sew an overlap part formed by at least double-folding webbing to a trim cover, in a sewing direction of a sewn part, a portion where the webbing overlap is reduced with respect to the above overlap is provided at an end of the overlap part of the webbing. The sewing process is performed over the portion where the webbing overlap is reduced and the webbing overlap part.

Advantageous Effects of Invention

According to the present invention, the portion where the overlap is reduced with respect to the overlap part easily follows shape change of the trim cover in correspondence with torn-opened state of the torn-open part. As the portion where the webbing overlap is reduced with respect to the overlap part guides the overlap part, it is possible to reduce the tensile force which acts on the webbing sewn part. With this configuration, it is possible to enable desired expanding operation of the side air bag in the case of emergency.

DESCRIPTION OF EMBODIMENT(S)

Hereinbelow, an embodiment of a vehicular seat according to the present invention will be described using FIGS. 1 to 9. Note that FIGS. 1 to 9 are drawings related to the embodiment of the present invention.

Figure 1:
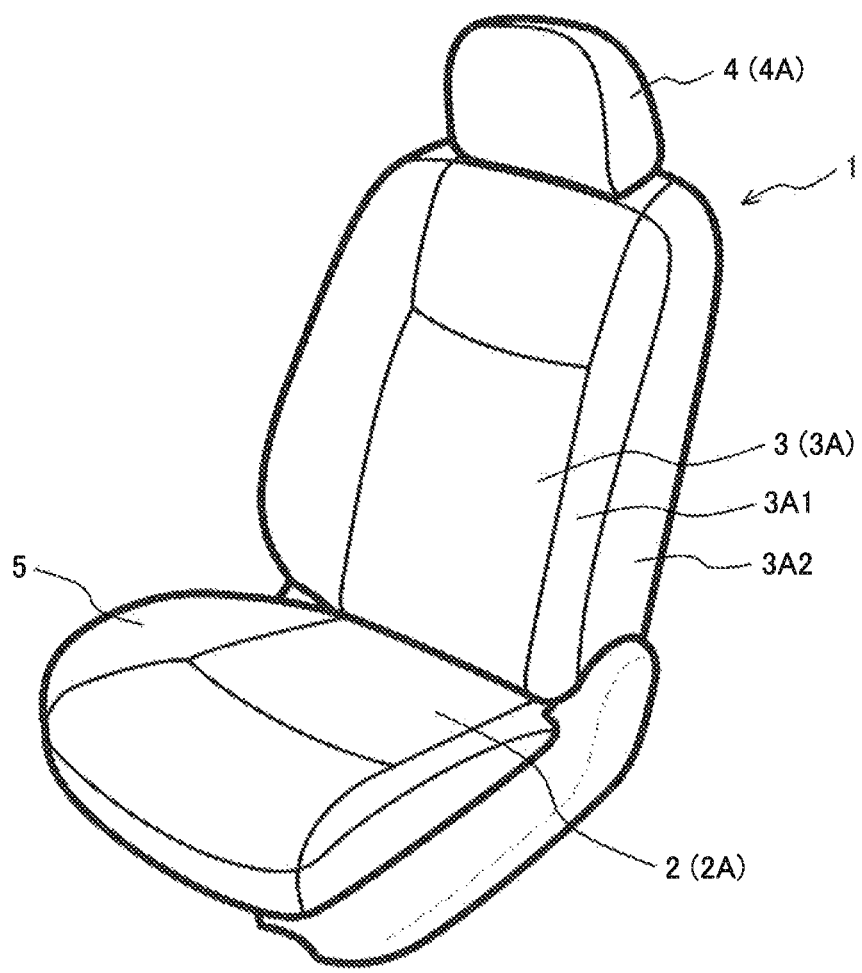
FIG. 1 is a perspective view showing the structure of a vehicular seat according to an embodiment of the present invention.

FIG. 1 is a perspective view showing the structure of a vehicular seat 1 according to the embodiment of the present invention.

The vehicular seat 1 has a seat cushion 2 on which a person is seated, a seat back 3 provided upright at a rear end of the seat cushion 2, and a head rest 4 provided at an upper end of the seat back 3. The seat cushion 2 is attached, in a state where its position is adjustable in a longitudinal direction, to a floor of the vehicle. The seat back 3 is connected, in a state where it is rotatable about its lower end, to a seat cushion 2. The head rest 4 is attached, in a state where its height position is adjustable, to the seat back 3.

In the seat cushion 2, the seat back 3, and the head rest 4, a seat frame as a structural parts and a cushion pad (cushion material) such as resin foam are provided inside. The surface of the cushion pad is covered with a trim cover (skin). In FIG. 1, the seat frame and the cushion pad are covered with the trim cover. The seat frame and the cushion pad are not shown.

In the following description, based on the vehicle in which the vehicular seat 1 is mounted, the respective directions, i.e., the longitudinal direction, the width direction and the height direction are defined. That is, the longitudinal direction means the longitudinal direction of the vehicle. The width direction means the width direction of the vehicle. The height direction means the height direction of the vehicle. In a state where the seat back 3 of the vehicular seat 1 is approximately upright, the longitudinal direction, the width direction and the height direction of the vehicular seat 1 (the seat cushion 2, the seat back 3, and the head rest 4) correspond to the longitudinal direction, the width direction, and the height direction of the vehicle respectively. Hereinbelow, the respective directions, the longitudinal direction, the width direction, and the height direction, used with respect to the vehicular seat 1, are described as directions in the state where the seat back 3 is approximately upright. Further, the horizontal direction and the vertical direction are defined based on a state where the vehicle is placed on a horizontal plane.

Figure 2:
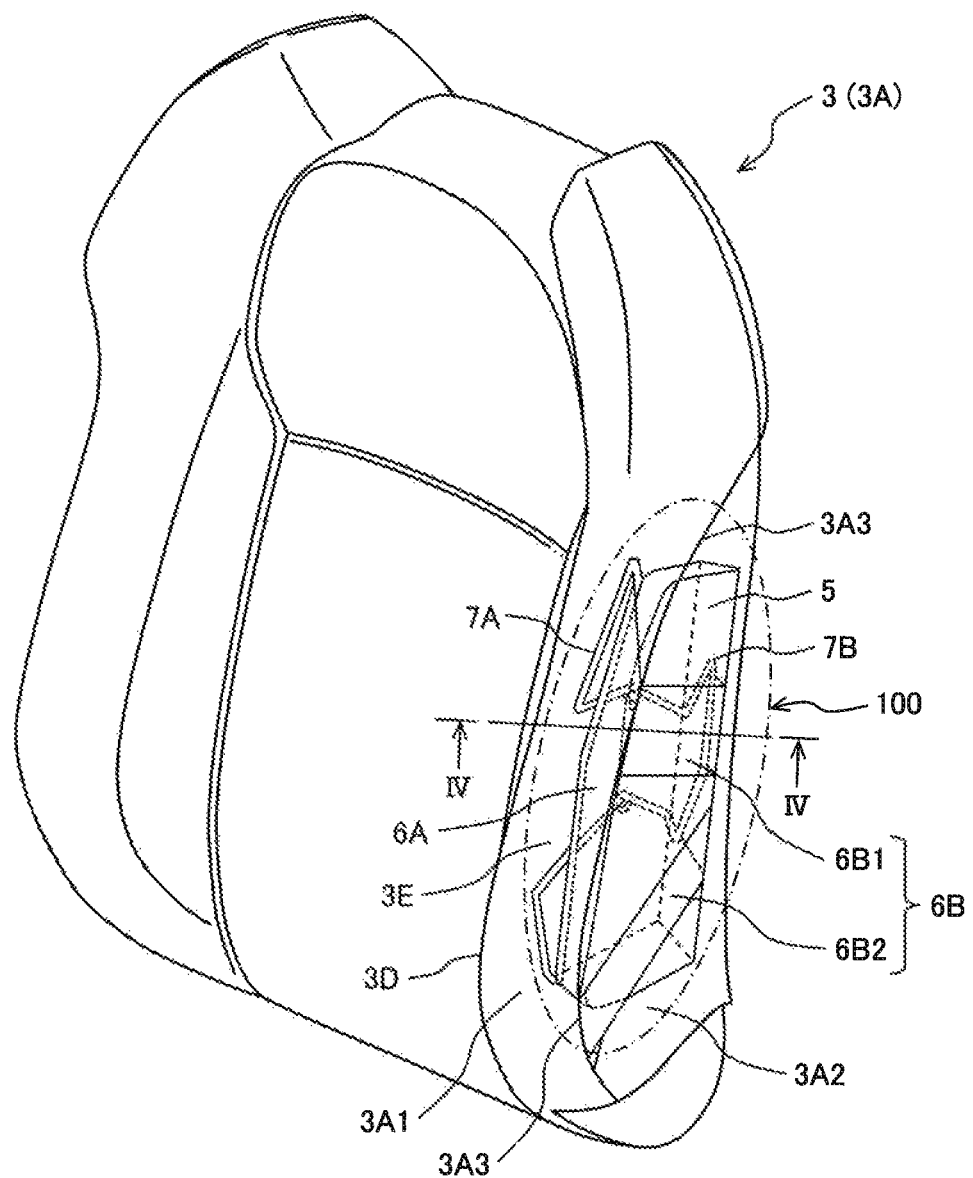
FIG. 2 is a perspective view of a seat back through which an accommodated side air bag is shown.

FIG. 2 is a perspective view of the seat back 3 through which an accommodated side air bag 100 is shown.

The form of the vehicular seat to which the present invention is applied is not limited to the form shown in FIG. 1, but vehicular seats in various forms may be used. The form of the seat back 3 in FIG. 2, which is different from the form of the seat back 3 in FIG. 1, may be any other form. In addition to these forms, as the seat back 3, various forms may be used as long as the seat back 3 accommodates the side air bag, and the extending part of the trim cover is torn-opened such that the side air bag is expanded.

A protrusion 3D protruding frontward is formed on the side part of the seat back 3. An air bag accommodation unit 3E to accommodate the side air bag 100 is formed inside the side part where the protrusion 3D is formed. Generally, in the seat back 3, the side air bag 100 is provided in the side part positioned on the side wall side (the door side or the window side) in the vehicular interior.

The side air bag 100 has an air bag 5, webbing (backing cloth) 6 (6A and 6B), and webbing wires 7A and 7B. The side air bag is assembled in the side part of the seat back 3. The air bag 5 is accommodated, generally in a contracted state, in the air bag accommodation unit 3E. The webbing 6A and 6B are provided, along with the webbing wires 7A and 7B, so as to surround the periphery of the air bag 5 in the horizontal direction. The webbing wires 7A and 7B are members to which ends of the webbing 6A and 6B are fastened.

The air bag 5, the webbing 6, and the webbing wires 7A and 7B will be described in detail using FIGS. 3 to 6.

Figure 3:
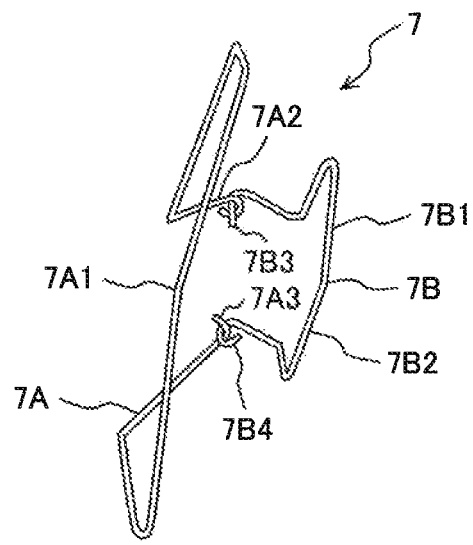
FIG. 3 is a perspective view showing the shape of a webbing wire to fasten an end of the webbing.

FIG. 3 is a perspective view showing the form of the webbing wires 7 (7A and 7B) to fasten the end of the webbing 6.

The webbing wires 7A and 7B shown in FIG. 2 have a shape as shown in FIG. 3. The webbing wire 7A and the webbing wire 7B are integrated by respectively connecting the both ends 7A2 and 7A3 of the webbing wire 7A to the both ends 7B3 and 7B4 of the webbing wire 7B. In the state where the webbing wire 7 is assembled in the seat back 3, connecting ends 7A2, 7A3, 7B3, and 7B4 between the webbing wire 7A and the webbing wire 7B are positioned in the side on the central side (inner side) with respect to the air bag 5 in the width direction of the seat back 3.

As shown in FIG. 2 and FIG. 3, the webbing wire 7A is extended from the connecting ends connecting ends 7A2 and 7A3 through the side inside of the seat back 3 with respect to the air bag 5 toward the front side of the seat back 3. A fastening part (catch) 7A1 is provided at the end, where the webbing wire 7A is extended, along the height direction of the seat back 3. An end of the webbing 6A is fastened to the fastening part 7A1.

As shown in FIG. 2 and FIG. 3, the webbing wire 7B is extended from connecting ends 7B3 and 7B4 through the side inside of the seat back 3 with respect to the air bag 5 so as to move around the rear side of the seat back 3. Fastening parts (catches) 7B1 and 7B2 are provided at the extended end of the webbing wire 7B, along the height direction of the seat back 3. The fastening part 7B1 is positioned on the upper side with respect to the fastening part 7B2. An end of the webbing 6B1 is fastened to the fastening part 7B1. An end of the webbing 6B2 is fastened to the fastening part 7B2.

The webbing wire 7 is connected to a seat frame 3B (see FIG. 4) provided inside the seat back 3. With this configuration, when an air bag body 5A (see FIG. 4) is expanded from the air bag accommodation unit 3E, the webbing wire 7 stays in the air bag accommodation unit 3E, to support the expansion of the air bag body 5A, along with the webbing 6A and 6B.

Figure 4:
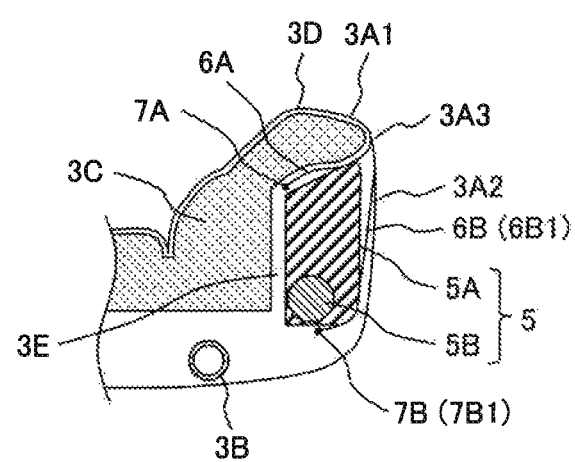
FIG. 4 is a cross-sectional view showing a lateral cross section of a containing unit for the side air bag.

FIG. 4 is a cross-sectional view showing a lateral cross section (IV-IV cross section shown in FIG. 2) of the accommodation unit 3E for a side air bag 100.

In the seat back 3, the cushion pad (cushion material) 3C is provided on the side where a person is seated (front side). In the seat back 3 (inner side of a trim cover 3A), the seat frame 3B is provided.

In the width direction of the seat back 3, the cushion pad 3C is provided on the center side of the air bag 5 (side air bag 100). The webbing wire 7 is provided between the air bag 5 and the cushion pad 3C.

Further, the cushion pad 3C forming the protrusion 3D is provided on the front side of the air bag 5 (side air bag 100). The webbing 6A is provided between the air bag 5 and the cushion pad 3C. The surface of the cushion pad 3C, provided on the front side of the air bag 5, is covered with a main part 3A1 of the trim cover 3A. The main part 3A1 is a member of the trim cover covering the front surface side of the seat back 3.

The side surface side of the seat back 3 in the air bag 5 is covered with a gore part 3A2 of the trim cover 3A. The gore part 3A2 is a part added to the trim cover 3A as a member of the trim cover to cover the side surface (thickness part) of the seat back 3. Webbing 6B1 and 6B2 are provided between the air bag 5 and the gore part 3A2.

The webbing wire 7B, the webbing 6B1 and 6B2 are provided on the rear side of the air bag 5 (side air bag 100). The webbing wire 7B is provided so as to go around from the side of the center side of the seat back 3 with respect to the air bag 5 to the rear side. Further, the webbing 6B1 and 6B2 are provided so as to go around from the side of the side surface side of the seat back 3 with respect to the air bag 5 to the rear side.

The air bag 5 is configured with the air bag body 5A to expand to the outside from the seat back 3 in the case of emergency, and an inflator 5B connected to a shock sensor (not shown) to sense impact upon collision. In normal times, the air bag body 5A is folded, in contracted state, in a predetermined shape. The inflator 5B is included inside the air bag body 5A. Note that in some cases, the air bag body 5A is simply referred to as an "air bag".

When the shock sensor senses shock, the air bag body 5A instantly expands with gas generation and ignition with the inflator 5B. The expanded air bag body 5A tear-opens the extending part (torn-open part) 3A3 formed with the main part 3A1 and the gore part 3A2 of the trim cover 3A, and protrudes to the outside of the seat back 3.

As described above, in the air bag 5, the periphery in the horizontal direction is surrounded with the webbing wires 7A and 7B and the webbing 6A and 6B. Especially, the webbing wires 7A and 7B are provided on the rear side and the center side of the seat back 3 with respect to the air bag 5. Accordingly, the air bag body 5A upon expansion is prevented from expanding to the rear side and the center side provided with the webbing wires 7A and 7B. Accordingly, the air bag body 5A expands frontward, and toward the side part covered with the gore part 3A2.

The cushion pad 3C provided in front of the air bag body 5A and the gore part 3A2 (trim cover 3A) covering the side part are made of easily-deformable or elastic material. Accordingly, only with the cushion pad 3C and the gore part 3A2, the force caused by expansion of the air bag body 5A is consumed for deformation or expansion of the cushion pad 3C and the gore part 3A2. With this configuration, it is impossible to enhance the force of the air bag body 5A to tear-open the extending part 3A3, or it takes time to enhance the tear-open force.

Accordingly, the webbing 6A is provided in front of the air bag body 5A, and the webbing 6B1 and 6B2 are provided in the side part on the gore part 3A2 side of the air bag body 5A. The webbing 6A and the webbing 6B1 and 6B2 are made of material having lower elasticity in comparison with the trim cover 3A (gore part 3A2) and the cushion pad 3C. For this reason, when the air bag body 5A expands, the webbing 6A and the webbing 6B1 and 6B2 almost do not extend, and guide the expanding direction of the air bag body 5A toward the extending part 3A3. With this configuration, it is possible to enhance the force to tear-open the extending part 3A3 in short time.

Figure 5:
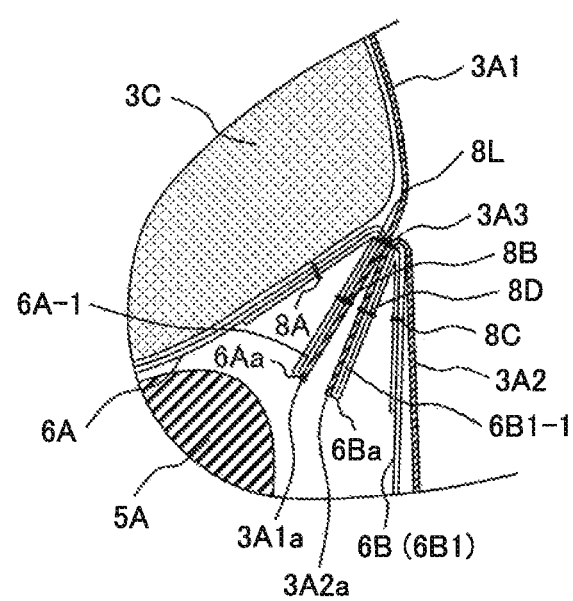
FIG. 5 is an enlarged cross-sectional view showing an enlarged part in the vicinity of an extending part (torn-open part) of a trim cover, in the lateral cross section shown in FIG. 4.
Figure 6:
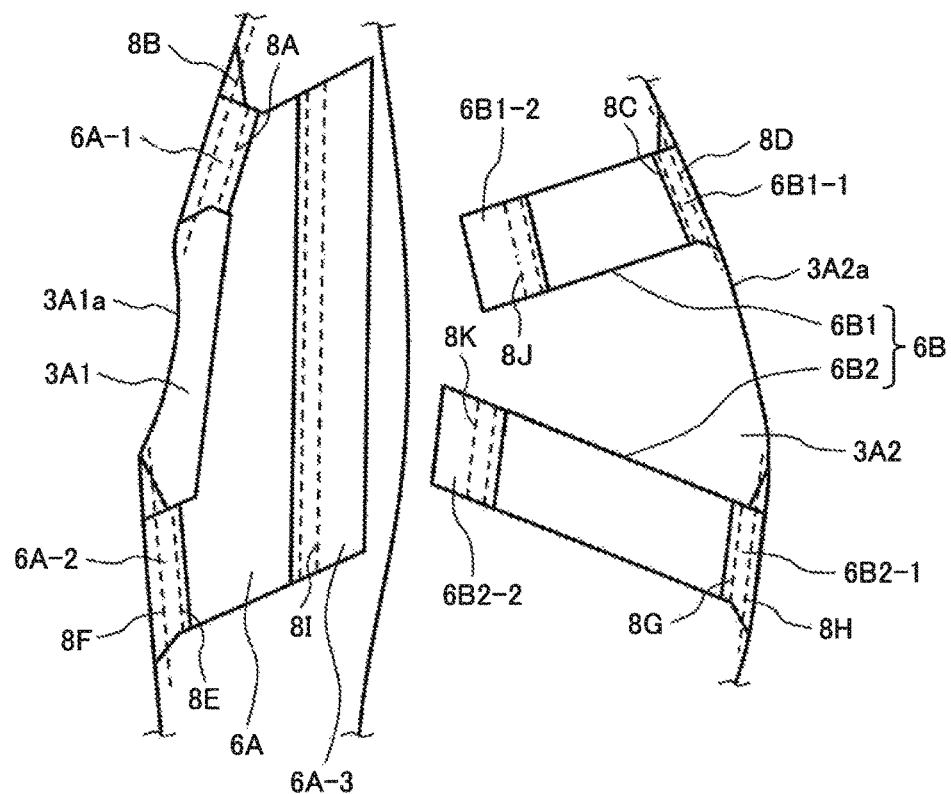
FIG. 6 is a plan view showing a sewn state between the trim cover and the webbing.

FIG. 5 is an enlarged cross-sectional view showing an enlarged part in the vicinity of the extending part (torn-open part) 3A3 of the trim cover 3A, in the lateral cross section shown in FIG. 4. FIG. 6 is a plan view showing a sewn state between the trim cover 3A and the webbing 6A and 6B. Note that FIG. 6 shows a state where the main part 3A1 and the gore part 3A2 of the trim cover 3A are extended.

With the expansion of the air bag body 5A, the extending part 3A3 is torn-opened. The air bag body 5A, expanded from the torn-opened extending part 3A3, exists between the passenger and the side wall of the vehicular interior, to protect the passenger.

The extending part 3A3 is formed by sewing the main part 3A1 and the gore part 3A2 of the trim cover 3A together with a sewing thread 8L. That is, the extending part 3A3 is formed with a sewn part formed by sewing the main part 3A1 and the gore part 3A2 with the sewing thread 8L.

In the vicinity of an end 3A1a of the main part 3A1 of the trim cover 3A (hereinbelow, referred to as an "end"), a sewn part 6A-1 and a sewn part 6A-2 of the webbing 6A are sewn with a sewing thread 8B and a sewing thread 8F. The sewn parts 6A-1 and 6A-2 are formed by wrap sewing of folding the respective ends into double-folded part, and sewing the double-folded part (overlap) with the sewing threads 8A and 8E. The wrap-sewn parts 6A-1 and 6A-2 are sewn to the main part 3A1 with the sewing threads 8B and 8F such that a pleat 6Aa (see FIG. 5) is aligned with the end 3A1a of the main part 3A1.

In the webbing 6A, an end, opposite to the end provided with the sewn parts 6A-1 and 6A-2, is provided with a wrap-sewn part 6A-3 sewn with the sewing thread 8I. The wrap-sewn part 6A-3 is formed in a bag shape, and the fastening part 7A1 of the webbing wire 7A is inserted through inside the wrap-sewn part 6A-3. With this configuration, the webbing 6A, with its end fastened with the webbing wire 7A, is held with the air bag accommodation unit 3E.

As described above, the webbing 6A is provided with two wrap-sewn parts 6A-1 and 6A-2, and the two wrap-sewn parts 6A-1 and 6A-2 are sewn to the main part 3A1. Note that the number of the wrap-sewn parts may be one, or more than three. Further, the number of overlap by wrap folding is not limited to two but may be more than three.

In the vicinity of an end 3A2a of the gore part 3A2 of the trim cover 3A (hereinbelow, referred to as an "end"), the webbing 6B1 and the webbing 6B2 are respectively sewn with sewing threads 8D and 8H. The webbing 6B1 is provided with a sewn part 6B1-1. The webbing 6B2 is provided with a sewn part 6B2-1. The sewn parts 6B1-1 and 6B2A-1 are formed by wrap sewing of folding the respective ends into double-folded part, and sewing the double-folded part (overlap) with the sewing threads 8A and 8E. The wrap-sewn parts 6B1-1 and 6B2-1 are sewn to the main part 3A1 with the sewing threads 8B and 8F such that a pleat 6Ba (see FIG. 5) is aligned with the end 3A2a of the gore part 3A2.

In the webbing 6B1, an end, opposite to the end provided with the sewn part 6B-1, is provided with a wrap-sewn part 6B1-2 sewn with the sewing thread 8J. The wrap-sewn part 6B1-2 is formed in a bag shape, and the fastening part 7B1 of the webbing wire 7B is inserted through inside the wrap-sewn part 6B1-2. With this configuration, the webbing 6B1, with its end fastened with the webbing wire 7B, is held with the air bag accommodation unit 3E.

In the webbing 6B2, an end, opposite to the end provided with the sewn part 6B2-1, is provided with a wrap-sewn part 6B2-2 sewn with a sewing thread 8K. The wrap-sewn part 6B2-2 is formed in a bag shape, and the fastening part 7B2 of the webbing wire 7A is inserted through inside the wrap-sewn part 6B2-2. With this configuration, the webbing 6B2, with its end fastened with the webbing wire 7B, is held with the air bag accommodation unit 3E.

Although the present embodiment has a configuration where the two webbing 6B1 and 6B2 are sewn to the gore part 3A2 of the trim cover 3A, however, it may have a similar configuration to that of the webbing 6A. Otherwise, it may have one webbing in a form different from that of the webbing 6A. Further, it may have a configuration where three or more webbing are provided.

As shown in FIG. 5, the main part 3A1 where the webbing 6A is sewn, and the gore part 3A2 where the webbing 6B1 and 6B2 are sewn, are sewn together with the sewing thread 8L. In a sewn part 6A-1, a sewing position (extending part 3A3) sewn with the sewing thread 8L is set between a sewing line with the sewing thread 8A and a sewing line with the sewing thread 8B; in a sewn part 6A-2, between a sewing line with the sewing thread 8E and a sewing line with the sewing thread 8F; in a sewn part 6B1-1, between a sewing line with the sewing thread 8C and a sewing line with the sewing thread 8D; and in a sewn part 6B2-1, between a sewing line with the sewing thread 8G and a sewing line with the sewing thread 8H. That is, with respect to the sewing line with the sewing thread 8L in the extending part 3A3, the sewing lines 8B and 8F are positioned on the end 3A1a side of the trim cover 3A, and the sewing lines 8D and 8H are positioned on the end 3A2a side of the trim cover 3A.

The strength of the sewing thread 8L is lower than the strength of the other sewing threads sewing the trim cover 3A. Especially, the strength of the sewing thread 8L is lower than the strength of the sewing threads 8B, 8F, 8D, and 8H sewing the webbing 6A, 6B1 and 6B2 to the trim cover 3A. With this configuration, the sewing thread 8L is torn off by expansion of the air bag body 5A, and the extending part 3A3 is torn-opened. At this time, it is necessary to hold the state where the webbing 6A, and 6B1 and 6B2 are sewn to the trim cover 3A.

Next, the wrap-sewn parts 6A-1 and 6A-2, and 6B1-1 and 6B2-1 of the webbing 6A and 6B will be described. Note that the sewn parts 6A-1 and 6A-2, and 6B1-1 and 6B2-1 have a common shape, the sewn part will be described without discrimination among the sewn parts 6A-1 and 6A-2, and 6B1-1 and 6B2-1.

Figure 7:
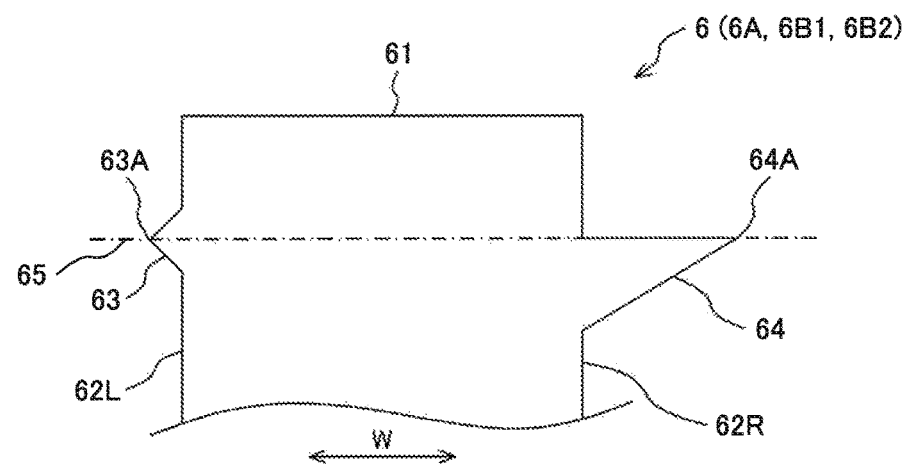
FIG. 7 is a plan view showing an extended end of the webbing sewn to the extending part side of the trim cover.

FIG. 7 is a plan view showing an extended end (the sewn parts 6A-1, 6A-2, 6B1-1, and 6B2-1) of the webbing webbing 6A and 6B sewn to the extending part 3A3 side of the trim cover 3A.

The webbing 6 (6A, 6B1, and 6B2) is formed of fabric having small extension degree in comparison with that of the trim cover 3A. Further, the webbing 6 is made of fabric having high tensile strength in comparison with that of the trim cover 3A.

As shown in FIG. 7, the webbing 6 has a triangular-shaped first protrusion 63 at an end (edge) 62L in a width direction W. It has a triangular-shaped second protrusion 64 at another end (edge) 62R. A line 65 connecting an apex 63A of the first protrusion 63 and an apex 64A of the second protrusion 64 is a return line for wrap-turning the webbing 6. The first protrusion 63 is formed symmetrically with respect to the return line 65.

In contrast, the second protrusion 64 is formed asymmetrically with respect to the return line 65.

In the second protrusion 64, a triangular shaped part is formed on one side (the side of the sewn parts 6A-3, and 6B1-2 and 6B2-2) with respect to the return line 65, while a triangular shaped part is not formed on the opposite side with respect to the return line 65. Accordingly, one side of the triangular shape forming the second protrusion 64 exists on the return line 65. That is, one side of the triangular shape forming the protrusion 64 corresponds with the return line 65.

Figure 8:
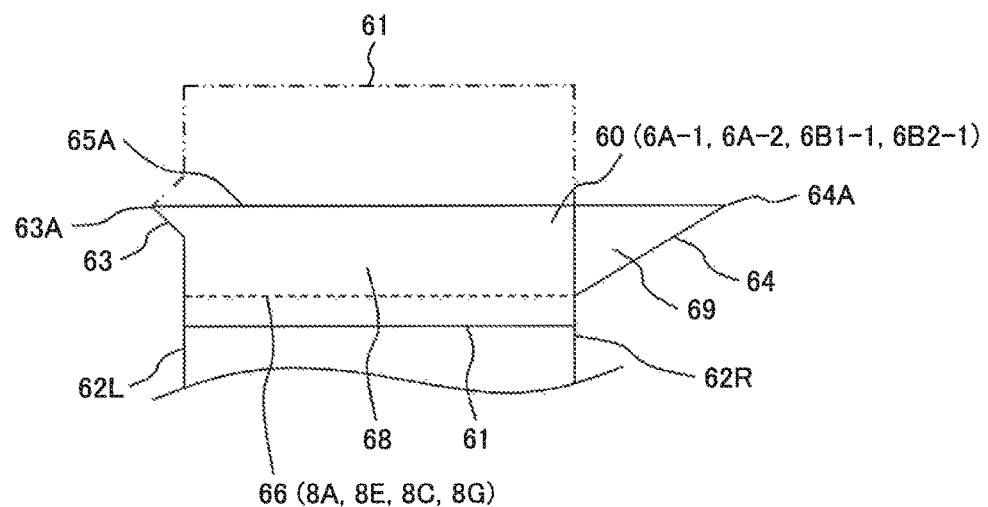
FIG. 8 is a plan view showing a state of the end of the webbing sewn to the extending part side of the trim cover before sewing to the trim cover.

FIG. 8 is a plan view showing a state of the end of the webbing 6A and 6B (the sewn parts 6A-1, 6A-2, 6B1-1, and 6B2-1) sewn to the extending part 3A3 side of the trim cover 3A before the sewing to the trim cover 3A. Note that the long double-short dashed line in FIG. 8 indicates a state before the end 61 is wrap-folded.

A sewn part 60 is formed by wrap-folding an end 61 of the webbing 6 from the return line 65, and sewing the wrap-folded part with a sewing thread 66 (8A, 8E, 8C and 8G). In the sewn part 60, an overlap part 68 in which the fabric is double-folded by wrapping sewing, and a non-overlap part 69 in which the fabric is not overlapped is formed. The non-overlap part 69 is formed with the second protrusion 64. Further, at an end 65A of the sewn part 60, the pleats 6Aa and 6Ba shown in FIG. 5 are formed.

Before sewing to the trim cover 3A (3A1 and 3A2), the webbing 6 is positioned with respect to the trim cover 3A (3A1 and 3A2) by aligning the end 65A formed with the pleats 6Aa and 6Ba with a terminal end (3A1a and 3A2a) of the trim cover 3A (3A1 and 3A2). That is, the end 65A is a mark for positioning with respect to the trim cover 3A (3A1 and 3A2).

Figure 9:
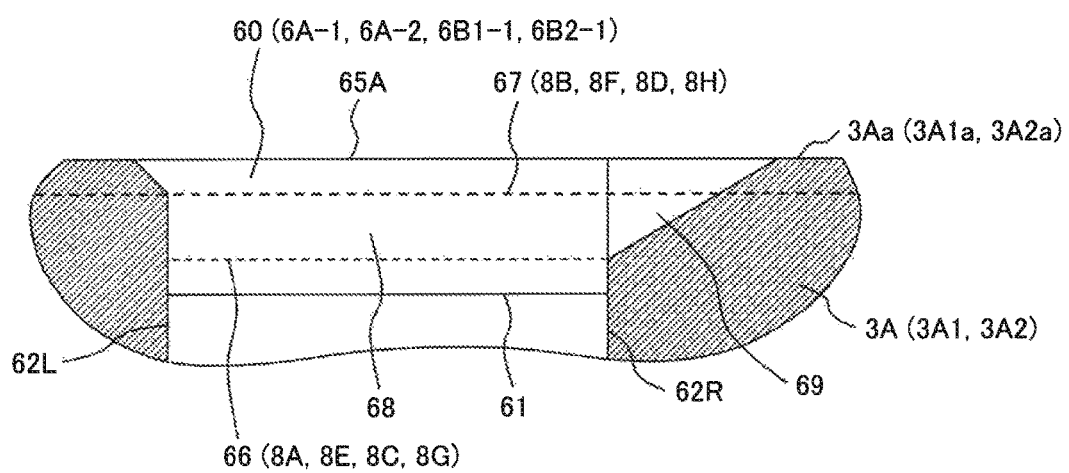
FIG. 9 is a plan view showing a state where the webbing is sewn to the trim cover.

FIG. 9 is a plan view showing a state where the webbing 6 is sewn to the trim cover 3A.

The webbing 6 is sewn to the trim cover 3A by sewing the sewn part 60 to the trim cover 3A (3A1 and 3A2) with a sewing thread 67 (8B, 8F, 8D, and 8H). The webbing 6 is sewn to the trim cover 3A such that the sewing thread 67 completely crosses the sewn part 60 in the width direction W. That is, the sewing thread 67 crosses the overlap part 68 and the non-overlap part 69 (second protrusion 64) in the width direction W.

Note that when the webbing 6 is merely sewn to the trim cover 3A, it is not necessary that the sewing thread 67 completely crosses the sewn part 60 in the width direction W, as long as it crosses over the overlap part 68 and the non-overlap part 69.

As described above, the webbing 6 is formed of fabric having small extension degree and high tensile strength. In general, the webbing 6 has low softness in comparison with the trim cover 3A. In the overlap part 68, as the fabric is folded, the softness is further lowered.

The trim cover 3A is formed of fabric having high elasticity and softness in comparison with the webbing 6. Accordingly, upon expansion of the air bag body 5A, the trim cover 3A is expanded toward the outside of the seat back 3 and is deformed. In particular, upon tear-opening of the extending part 3A3, the trim cover 3A is further greatly and complicatedly deformed toward the outside of the seat back 3 with the air bag body 5A which expands by tear-opening the main part 3A1 and the gore part 3A2 of the trim cover 3A.

In the present embodiment, the webbing 6 has, not a form to cover the entire air bag body 5A but a form to surround a part of the air bag body 5A with the band-shaped webbing 6. In the trim cover 3A, a part which the webbing 6 is not sewn to is pulled with the expanding air bag body 5A and greatly deformed toward the outside of the seat back 3. In contrast, the webbing 6 has no extensibility and softness in comparison with the trim cover 6.

In particular, in the overlap part 68, as the fabric is folded in plural layers and sewn to the trim cover 3A, the softness is significantly lowered. Accordingly, the overlap part 68 does not follow the deformation of the trim cover 3A. A force to separate the overlap part 68 of the webbing 6 which does not follow the deformable trim cover 3A and the trim cover 3A away from each other acts between them. Accordingly, there is a possibility that a large tensile force acts on the sewing thread 67 sewing the webbing 6 to the trim cover 3A.

The large tensile force acts on the sewing thread 67, which easily causes breakage of the sewing thread 67. When the sewing thread 67 breaks before the air bag body 5A completely expands, the webbing 6 is separated from the trim cover 3A. It is difficult to guide the expansion of the air bag body 5A with the webbing 6 in an appropriate direction.

In the present embodiment, in the sewing direction of the sewing thread 67, the non-overlap part 69 is provided at the end 62R of the webbing 6. The non-overlap part 69 has high softness in comparison with the overlap part 68. Accordingly, upon expansion of the air bag body 5A, it follows the deformation of the trim cover 3A. Further, the non-overlap part 69 following the deformation of the trim cover 3A guides the overlap part 68 in the deformation direction of the trim cover 3A. With this configuration, in comparison with a case where there is no non-overlap part 69, it is possible to reduce the tensile force which acts on the sewing thread 67 at the end of the overlap part. This enables the side air bag 100 to perform a desired operation regarding the expansion direction and the expansion speed of the air bag body 5A.

That is, in the present embodiment, the second protrusion 64 (non-overlap part 69) has a soft part which easily follows the deformation of the trim cover with respect to the overlap part 68. With this configuration, the tensile force which acts on the sewing thread 67 is reduced, and prevents breakage of the sewing thread 67.

In the present embodiment, it is possible to reduce the tensile force which acts on the sewing thread 67 upon expansion of the air bag body 5A. Accordingly, it is not necessary to especially enhance the strength of the sewing thread 67. It is possible to sew the webbing 6 to the trim cover 3A with the same sewing thread as that used for sewing of the other parts of the trim cover 3A. Accordingly, the efficiency of sewing work in the trim cover 3A is improved.

In the present embodiment, in the overlap part 68, the fabric is double-folded. Further, the fabric may be further folded in more layers. Further, in the non-overlap part 69, the number of folding of the fabric may be reduced with respect to the overlap part 68, so as to obtain softness with respect to the overlap part 68. For the purpose of cost reduction and improvement in workability, as described above, it is desirable that in the overlap part 68, the fabric is double-folded, and in the non-overlap part 69, the fabric is not folded.

The shapes of the first protrusion 63 and the second protrusion 64 are not limited to the triangular shape but may be any other shape. For example, it may be a rectangular shape. It is not necessary that the first protrusion 63 is symmetrical to the return line 63A, but may have e.g. a shape like the second protrusion 64. It is not necessary that in the second protrusion 64, one side of the triangular shape corresponds with the return line 65. The side may protrude over the return line 65 to the opposite side. Note that the second protrusion 64 must not have a shape which reaches the sewing line of the sewing thread 67 to prevent formation of the non-overlap part 69.

In the above-described embodiment, the second protrusion 64 (non-overlap part 69) is provided on one side 62R of the webbing 6 in the sewing direction of the sewing thread 67 (the width direction W of the webbing 6).

The second protrusion 64 (non-overlap part 69) may be provided on the side (part) where a strong tensile force acts on the sewing thread 67 upon tear-opening of the extending part 3A3. Accordingly, it may be provided on the both sides 62R and 62L of the webbing 6. Otherwise, the sides 62R and 62L provided with the second protrusion 64 (non-overlap part 69) may be changed by each of the sewn parts 6A-1, 6A-2, 6B1-1, and 6B2-1 of the webbing 6A and 6B. Further, the second protrusion 64 (non-overlap part 69) may be provided on the both sides 62R and 62L or one side of the webbing 6 by each of the sewn parts 6A-1, 6A-2, 6B1-1, and 6B2-1.

REFERENCE SIGNS LIST

1 . . . vehicular seat, 2 . . . seat cushion, 3 . . . seat back, 3A . . . trim cover, 3A1 . . . main part of trim cover 3A, 3A2 . . . gore part of trim cover 3A, 3A3 . . . extending part (torn-open part) of trim cover 3A, 3B . . . seat frame, 3C . . . cushion pad (cushion material), 3E . . . air bag accommodation unit, 5 . . . air bag, 5A . . . air bag body, 5B . . . inflator, 6, 6A, 6B . . . webbing (backing cloth), 6A-1, 6A-2, 6A-3, 6B1-1, 6B2-1, 6B1-2, 6B2-2 . . . wrap-sewn part, 6Aa, 6Ba . . . pleat, 7, 7A, 7B . . . webbing wire, 8A to 8L . . . sewing thread, 60 . . . wrap-sewn part, 61 . . . end of webbing 6, 63 . . . first protrusion, 63A . . . apex of first protrusion 63, 64 . . . second protrusion, 64A . . . apex of second protrusion 64, 65 . . . return line, 66 . . . sewing thread (8A, 8E, 8C, 8G), 67 . . . sewing thread (8B, 8F, 8D, 8H), 68 . . . fabric overlap part, 69 . . . fabric non-overlap part, 100 . . . side air bag.

The invention claimed is:

1. A vehicular seat having: a seat cushion on which a person is seated; a seat back provided upright at a rear end of the seat cushion; and a trim cover covering a surface of the seat back, wherein a side air bag, having an air bag body and webbing provided around the air bag body, with an end of the webbing sewn to an extending part of the trim cover, is provided on a side of the seat back, and wherein the air bag body expands to tear-open the extending part, and expands to the outside of the seat back,
wherein the webbing has a wrap-sewn part with a terminal end wrap-folded, at an end sewn to the trim cover,
the wrap-sewn part has: an overlap part in which the webbing is wrap-folded; and a non-overlap part provided at an end of the overlap part in a direction along a sewing line sewn to the trim cover, and
the wrap-sewn part is sewn over the overlap part and the non-overlap part with respect to the trim cover.

2. The vehicular seat according to claim 1,
wherein the trim cover has a main part provided on a front surface side of the seat back, and a gore part provided on the side surface side of the seat back,
the extending part is formed by sewing the main part and the gore part together with a sewing thread,
the webbing has first webbing sewn to the main part and second webbing sewn to the gore part, wherein the wrap-sewn part is formed in the first webbing with an end of the wrap-sewn part forming a pleat, and a second wrap-sewn part is formed in the second webbing with an end of the second wrap-sewn part forming a pleat,
a sewn part between the first webbing and the main part is positioned on a pleat side of the wrap-sewn part provided in the first webbing with respect to the sewing thread to sew the extending part, and
a sewn part between the second webbing and the gore part is positioned on a pleat side of the second wrap-sewn part provided in the second webbing with respect to the sewing thread to sew the extending part.

3. The vehicular seat according to claim 2,
wherein the non-overlap part is formed with a triangular-shaped part provided at one edge of the webbing, and the pleat of each of the wrap-sewn part corresponds with one side of the triangular-shaped part.

4. The vehicular seat according to claim 3,
wherein the webbing has a triangular-shaped protrusion at another edge, and
the pleat passes through an apex of the triangular shape forming the protrusion.

\* \* \* \* \*